United States Patent

[11] 3,579,893

| [72] | Inventor | Henry S. Wolfe<br>Beaver Hill Bldg., Jenkintown, Pa. 19046 |
|---|---|---|
| [21] | Appl. No. | 786,203 |
| [22] | Filed | Dec. 23, 1968 |
| [45] | Patented | May 25, 1971 |

[54] REFLECTING FISHING FLOAT
1 Claim, 6 Drawing Figs.

[52] U.S. Cl............................................. 43/17.5,
43/42.33, 43/43.1, 9/8
[51] Int. Cl............................................. A01k 93/00
[50] Field of Search........................................ 43/17.5,
42.33, 42.34, 43.1; 9/8, 8.3

[56] References Cited
UNITED STATES PATENTS
1,318,650 10/1919 Dutka............................ 9/8

| 1,804,084 | 5/1931 | Blake............................ | 43/17.5 |
| 2,753,650 | 7/1956 | Rentz et al..................... | 43/42.33 |
| 3,315,285 | 4/1967 | Farmer........................... | 9/8 |

Primary Examiner—Samuel Koren
Assistant Examiner—Daniel J. Leach
Attorney—Karl L. Spivak ABSTRACT: A reflecting fishing float comprising a buoyant body member preferably of generally spherical configuration having an upper hemispherical portion provided with a plurality of flat, angularly disposed reflecting surfaces thereon adapted to reflect rays from the sun directly to a viewer. The lower hemispherical portion has a smooth external configuration. A plunger means extends axially through the upper hemispherical portion and has line-attaching means thereon.

INVENTOR
HENRY S. WOLFE

BY Karl L. Spivak

ATTORNEY

PATENTED MAY 25 1971

INVENTOR
HENRY S. WOLFE

BY *Karl L. Spivak*

ATTORNEY

REFLECTING FISHING FLOAT

BACKGROUND OF THE INVENTION

This invention relates to the general art of sporting goods and more particularly, is directed to a novel type of reflecting fishing float for use by fishermen in connection with conventional fishing tackle.

Fishing floats have long been used by sportsmen and fishermen in conjunction with the usual fishing tackle to readily observe when fish have taken the bait. Prior art fishing floats have been fabricated of such buoyant materials as wood, cork and more recently, of hollow plastic materials.

The more recent plastic materials have been formed to a spherical configuration by prior workers in the field and have included means for readily engaging and disengaging the fishing line by utilizing spring plunger assemblies. These prior art plastic fishing floats have usually been fabricated of highly colorful and therefore readily apparent plastic materials to enable the fisherman to more easily discern the float in the water. Such prior art fishing floats have the disadvantage in operation in bright sunlight in that their position is not readily seen by the fisherman despite the highly colorful exterior construction. Since a fisherman may have more than one float in the water at one time, it is imperative that he be able to tell at a glance the exact location and position of all fishing floats. Moreover, if the position of the fishing floats cannot be easily observed, then one of the important functions of the float, namely to signal when a strike is made on the lure or bait, is greatly diminished.

SUMMARY OF THE INVENTION

In accordance with the teachings of the present invention, there is provided a fishing float comprising a body member wherein at least a portion includes reflecting means adapted to reflect sun rays directly to a viewer wherever the viewer may be stationed. Further, a plurality of reflecting surfaces have been provided in accordance with the teachings of the instant invention to thereby direct the attention of the user to the exact position of the fishing float. The fishing float has been designed to catch the sun's rays in any position by offering a great number of reflecting surfaces, all of which are angularly disposed to every other such surface. In this manner, one reflecting surface always properly positions between the fisherman and the sun to directly reflect into the eyes of the fisherman.

Preferably, the reflecting means may comprise a plurality of flat surfaces or facets of a highly reflective nature. The plurality of such surfaces or facets extend entirely over substantially the upper half of the float inasmuch as it is the upper half which is above the water level when the float is operative.

The float is preferably constructed spherical in configuration, is formed of plastic material and with reflecting means which may be situated interiorally or exteriorly of the body of the float. In the former case, the material from which the float body is so manufactured may be transparent so that reflected light from the internal reflecting surfaces may readily be observed.

The reflecting facets may be made by molding the float body from plastic material in such a manner that a plurality of flat sections are impressed or otherwise molded onto the exterior surface. These flat sections can then subsequently be made reflective by such methods as chrome plating, painting with a light-reflecting paint or by other suitable methods.

Alternatively, reflective material such as glass, mirror or highly polished metals may be embedded in the float body after molding. Also, a reflecting foil or like surface may be applied to the interior surface of the float body, in which latter case, the float body should be molded from transparent plastic material. The desired effect may also be obtained by directly molding a plastic material containing a pearlescent additive to the required configuration.

Accordingly, it is an object of the present invention to provide an improved reflecting fishing float of the type set forth.

It is another object of the present invention to provide a reflecting fishing float fabricated of plastic material that may be readily and inexpensively formed to the desired configuration.

It is another object of the present invention to provide a reflecting fishing float incorporating a plurality of reflecting surfaces thereon.

It is another object of the present invention to provide a reflecting fishing float having a plurality of integrally formed, molded, reflecting surfaces fabricated thereon.

It is another object of the present invention to provide a reflecting fishing float including highly reflective means of various configurations that are angularly disposed to each other.

It is another object of the present invention to provide a reflecting fishing float that is simple in construction, inexpensive in manufacture and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

DESCRIPTION OF THE PREFERRED EMBODIMENT OF THE INVENTION

Figure 2:
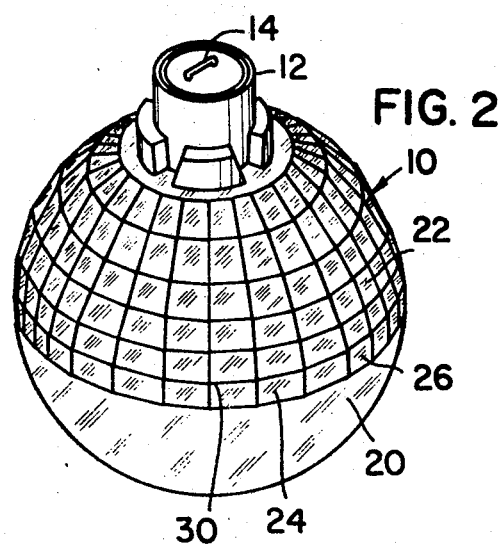
FIG. 2 is an enlarged perspective view of a preferred embodiment of the invention.

Although specific terms are used in the following description for the sake of clarity, these terms are intended to refer only to the particular structure of my invention selected for illustration in the drawings and are not intended to define or limit the scope of the invention.

Referring now to the drawings, I show in FIG. 2 a hollow fishing float 10 of generally spherical configuration and provided in well-known manner with an axial spring-biased plunger 12 and conventional line-attaching means 14 for connecting to the fishing line 16 for operation in the water 18 to thereby give visual indication of when the bait or lure is taken by a fish (not shown). The fishing float 10 is preferably formed of hollow, molded plastic material which may be spherically formed into a bottom half 20 and a reflecting half 22 by utilizing well-known conventional fabricating methods.

The bottom half 20 is conventionally formed to a hemispherical configuration and floats beneath the surface of the water 18 in the usual manner. It is contemplated that the reflecting half 22 will ride above the surface of the water 18 due to the natural buoyancy of the hollow-formed fishing float 10. The reflecting float half 22 is fabricated to provide a plurality of angularly juxtaposed flat surfaces 24 of various sizes cooperating in edge-to-edge contact to generally overlie the spherical configuration of the fishing float to thereby approximately produce an overall spherical shape. Each flat surface 24 forms a geometric, two-dimensional figure which may be a rectangle 26 as in FIG. 2, a triangle 28 as in FIG. 5, or any other flat surface configuration that will serve to reflect the light from the sun's rays.

Figure 3:
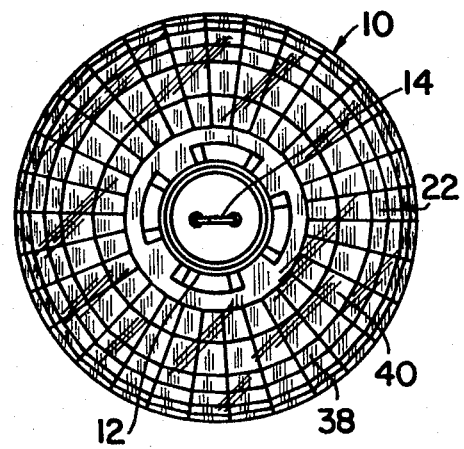
FIG. 3 is an enlarged top plan view of the invention showing reflecting surfaces of modified design.
Figure 1:
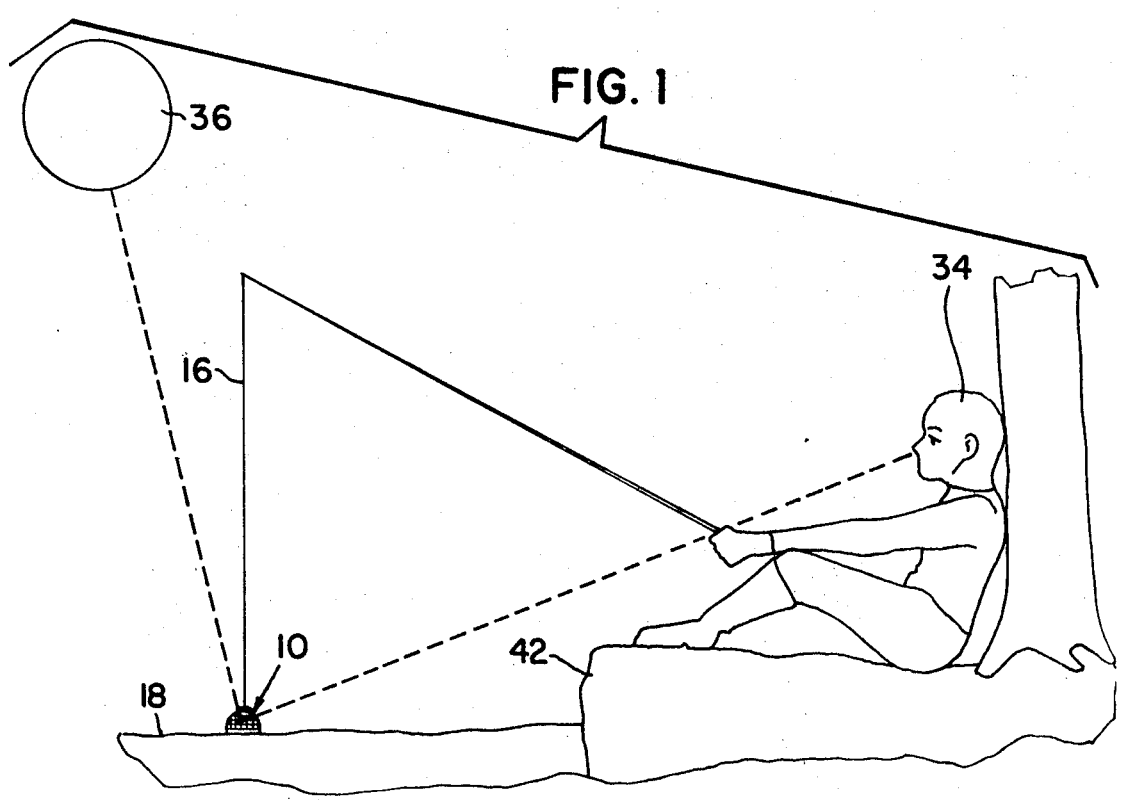
FIG. 1 is a perspective view showing the invention in use.
Figure 4:
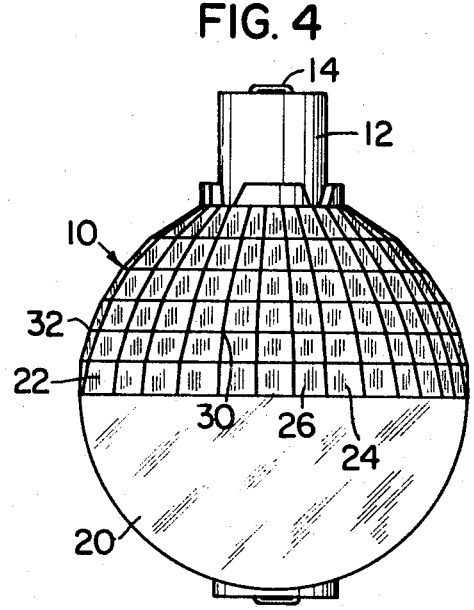
FIG. 4 is an enlarged, side elevational view of the invention.
Figure 5:
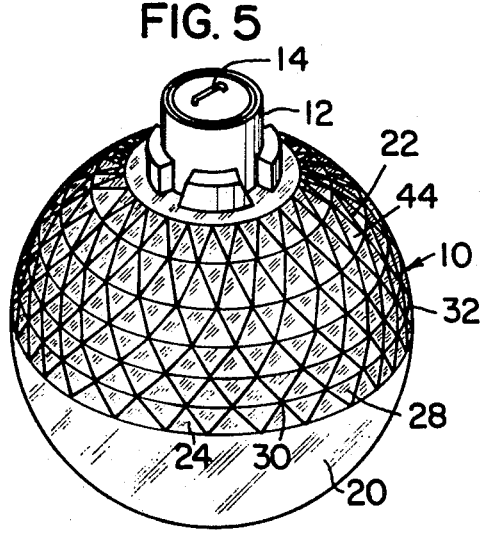
FIG. 5 is an enlarged perspective view of the invention showing reflecting surfaces of a modified design.

It will be observed in FIGS. 3 and 5 that each reflecting flat surface 24, whether of rectangular configuration 26 or triangular configuration 28, intersects with the next adjacent flat surfaces at an intersecting point 30 which is fabricated to lie along the hemispherical surface line 32 which would coincide with the surface configuration had the fishing float reflecting half 22 been fabricated to an exact hemispherical configuration. It is thus seen that the plurality of adjacent flat reflecting surfaces 24 approximate the shape of a true, hemispherical configuration. It can be readily observed and appreciated that as the rectangular surfaces 26 and triangular surfaces 28 are constructed to increasingly smaller configurations, more intersecting points 30 will be required and accordingly, the shape of the reflecting half 22 will more closely approximate a true hemispherical configuration. Similarly, larger flat surfaces 24, if employed, will result in substantial deviation from the true hemispherical shape.

The entire reflecting float half 22 is painted or otherwise treated with a reflecting surface coating material 44 to thereby reflect any rays of the sun 36 which fall upon the float surface. The angularly disposed reflecting surfaces or facets 26, serve to angularly reflect all of the sun's rays for ready observation by the fisherman 34, no matter where he is positioned.

Figure 6:
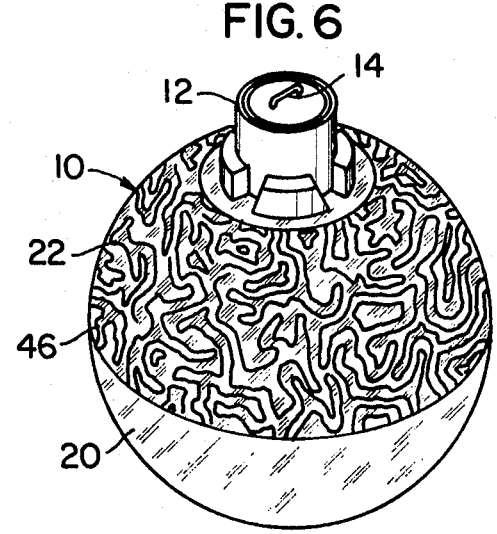
FIG. 6 is an enlarged perspective view of the invention showing reflecting surfaces of a modified design.

In FIG. 6, I show a fishing float 10 comprising a bottom half 20 and a reflecting half 22 in the usual manner and including on the reflecting half 22 is pattern 46 of any desired configuration to attract the fisherman's attention. In accordance with the present invention, the pattern 46 is preferably painted upon the surface of the reflecting half 22 by utilizing a pearlescent paint which can attract and reflect the sun's rays.

In FIG. 3, I show a modified design wherein the reflecting half 22 of the fishing float 10 is fabricated of transparent plastic material 38. A plurality of angularly disposed, reflecting surfaces 40 are carried beneath the surface of the transparent material 38 and are so positioned and arranged that light rays may readily be reflected directly through the surface material. Such construction has the advantage of completely protecting the reflecting surfaces 40 from wear or abrasion.

In order to use the invention, a fisherman stands upon the shore 42 and casts his tackle into the water 18 with fishing float 10 affixed to a portion of the fishing line 16. The bottom 20 of the fishing float 10 submerges beneath the surface of the water 18 and the reflecting half 22 floats above the water surface with the reflecting surface thereby being visible. Because of the movement of the fishing float 10 upon the water which is normally always in motion, or upon movement of the fisherman himself, one or more of the reflecting surface 24 or 40 of whatever configuration is utilized, always positions between the sun 36 and the eyes of the fisherman 34 in such a manner as to reflect the sun's rays to attract the attention of the fisherman. In this manner, the fisherman 34 can readily locate the fishing float 10 in the water 18 simply by having his attention directed in accordance with the reflected sun's rays.

It should be understood that the float may be constructed of any desired shape and cross section and still fall within the scope and meaning of this invention. Additionally, the fishing float 10 may be made of any suitable material other than molded plastics. Furthermore, the float may be of solid or part solid material and may be part spherical in configuration. The reflecting surface may extend over the whole of the body or merely over that part of which the body which is visible above the water level when the float is in position. Additionally, a float constructed in accordance with the present invention may be used for indicating the position of lobster traps, nets or other types of traps used by fisherman. It is further contemplated that such a design may also find utility with buoys or other floating objects to readily call attention channel markers, danger areas, location of submerged objects, etc.

I claim:
1. In a reflecting fishing float for floating at the surface of water of the type suitable for removable affixing to a fishing line, the combination of:
 A. a body of generally hollow, spherical configuration,
  1. said body being generally divided into a pair of upper and lower hemispherical portions,
   a. said upper hemispherical being fabricated to provide a plurality of reflecting means,
   b. said lower hemispherical portion being normally positioned beneath the water surface and
   c. said lower hemispherical portion having a smooth external configuration;
 B. the said reflecting means fabricated in the upper hemispherical portion being arranged to provide a plurality of flat surfaces capable of reflecting rays from sunlight,
  1. each said respective flat surface being angularly disposed with respect to each other flat surface,
  2. each said respective flat surface being respectively joined in juxtaposed edge-to-edge relationship to form a plurality of intersecting points,
   a. each intersecting point lying along a line which would define a true hemispherical surface at the upper hemispherical portion;
 C. plunger means axially extending through the said upper hemispherical portion,
  1. said plunger means including line-attaching means,
   a. said line-attaching means being spaced from the said lower hemispherical portion,
   b. said line-attaching means positioning the fishing float with the upper hemispherical portion above the surface of the water for sunlight reflecting purposes.